United States Patent
Jakobsson et al.

(10) Patent No.: US 7,356,845 B2
(45) Date of Patent: Apr. 8, 2008

(54) METHOD AND APPARATUS FOR IDENTIFICATION TAGGING DOCUMENTS IN A COMPUTER SYSTEM

(75) Inventors: Bjorn Markus Jakobsson, Hoboken, NJ (US); Adam Lucas Young, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 715 days.

(21) Appl. No.: 10/060,599

(22) Filed: Jan. 30, 2002

(65) Prior Publication Data

US 2003/0145207 A1    Jul. 31, 2003

(51) Int. Cl.
| | |
|---|---|
| G06F 7/04 | (2006.01) |
| G06F 11/30 | (2006.01) |
| H04N 7/167 | (2006.01) |
| H04L 9/28 | (2006.01) |
| H04L 1/00 | (2006.01) |
| G06K 19/073 | (2006.01) |
| G06K 7/08 | (2006.01) |

(52) U.S. Cl. .................. 726/26; 713/187; 713/194; 380/202

(58) Field of Classification Search ........... 713/202, 713/201, 200, 164, 176, 188, 187, 193, 194; 380/201, 202; 726/26
See application file for complete search history.

(56) References Cited

U.S. PATENT DOCUMENTS 5,327,570 A * 7/1994 Foster et al. ............ 709/213
6,418,472 B1 * 7/2002 Mi et al. ................. 726/26
6,889,209 B1 * 5/2005 Rabin et al. ............. 705/57

OTHER PUBLICATIONS

Xiaowei Yang, David Wetherall, Thomas Anderson, "A DoS-limiting Network Architecture", Aug. 2005, ACM SIGCOMM Computer Communication Review, Proceedings of the 2005 Conference on Applications, Technologies, Architectures, and Protocols for Computer Communications SIGCOMM '05, vol. 35 Issue 4, pp. 241-252.*

* cited by examiner

*Primary Examiner*—Gilberto Barron
*Assistant Examiner*—Courtney D Fields

(57) ABSTRACT

A method and apparatus for tracing of computer documents is disclosed. A computer processor stores a processor identifier that is unique to the particular processor. Documents created by a computer system are tagged with an identification tag that is a value which results from performing a cryptographic function on the hash of the document and the unique processor identifier. Processor associators are stored in a secure database, with each of the processor associators being associated with one of the unique processor identifiers. In a first embodiment, the processor associators are the same as the processor identifiers. In a second embodiment, the processor identifiers are a function of their related processor associator. Documents may be traced by a third party possessing a document (including an attached identification tag) and a database of processor associators and user identification data associated with each of the processor associators. In one embodiment, the third party computes a document tag for the particular document using each of the processor associators until a tag is computed which matches the tag that was attached to the document. When such a match is found, the source of the document may be determined by reference to the user identification data associated with the processor associator that was used to compute the matching identification tag.

20 Claims, 3 Drawing Sheets

METHOD AND APPARATUS FOR IDENTIFICATION TAGGING DOCUMENTS IN A COMPUTER SYSTEM

FIELD OF THE INVENTION

The present invention relates generally to computer security. More particularly, the present invention relates to the use of cryptographic techniques for secure tracing of computer-generated documents.

BACKGROUND OF THE INVENTION

With the increased use of computer networks, including the Internet, computer security has become an important consideration. There are many techniques currently in use for protecting computer systems connected to a network. For example, firewalls and computer virus software attempt to protect computers from various types of attacks. These techniques are helpful in preventing the spread of computer viruses as well as other types of network attacks.

Another aspect of computer security is investigation. That is, once a particular network attack or attempted attack has taken place, an investigation is launched in order to determine the source of the attack.

One known technique for investigating computer network attacks is through the use of a computer processor identifier. Recent computer processor technology allows the incorporation of a unique identifier into every processor. These identifiers are hardwired into the processor's design, and as such, cannot be changed or modified via software. One technique for using these identifiers for investigative purposes is to label documents and programs created or transmitted by the processor (or the computer system utilizing the processor) with the unique identifier. As such, if a virus is created by a particular computer, in certain cases it may be possible to examine the virus code to determine the processor identifier. In such cases, if the computer manufacturer (or another entity) maintains a database associating processor identifiers with specific users, then the virus could be traced back to the particular user.

However, there are significant privacy problems associated with the above described use of processor identifiers. Such privacy problems exist even under the assumption that the database is held in confidence by the computer manufacturer (or other entity). For example, all documents produced by a particular processor can be matched to each other by examining the identifier. This alone is a serious privacy concern. Especially when taking into account the myriad of attempts by Internet merchants to collect user information, the mere correlation of processor identifiers, especially in combination with other data collected over time, could reveal the identity of users.

Another problem is one of framing, and is related to the broader problem of identity theft. An attacker may learn the processor identification associated with a legitimate user (for example by examining documents known to be created by the legitimate user). The attacker may then replace his/her own processor identification with the processor identification of the legitimate user in documents created by the attacker. If one such document is a virus, for example, then upon investigation of the virus code, authorities would be led to believe that the legitimate user was the source of the virus.

SUMMARY OF THE INVENTION

The present invention provides a method and apparatus that allows for the investigative tracing of computer generated documents, but prevents unauthorized third parties from determining the identity of other users and from framing other users.

In accordance with the invention, documents are tagged with a value that results from performing a cryptographic function on a function of the document (e.g., hash function) and a unique identifier stored in the processor of the system that creates the document. The use of cryptographic techniques makes it impossible for a third party who possesses the tag to determine the identity of the document creator solely from information found in the tag. Instead, in order to determine the source of the document, the third party must also be in possession of a so-called processor associator that is associated with the processor identifier used in the cryptographic function.

In a first embodiment of the invention, the processor associators are the same as the processor identifiers. In this embodiment, a third party in possession of the document (including the attached identification tag), and a database of existing processor identifiers, may trace the source of the document by creating an identification tag for the document using each of the stored existing processor identifiers. When the computed identification tag matches the identification tag included in the document to be traced, then the source of the document has been found.

In a second embodiment of the invention, the processor associators are not the same as the processor identifiers, but instead the processor identifiers are a function of the processor associators. As described in further detail below, in return for added computational complexity required for tracing, this second embodiment provides the benefit that the tracing party may be distributed.

The use of a hash of the document to be tagged (advantageously a hash function) as input to the cryptographic function provides an advantage in that the resulting tag is specific to the document itself. As such, the tag cannot be maliciously transferred to another document in an attempt to make it appear that the creator of the original document also created the other document. Since the value of the identification tag is dependent on the contents of the document itself being tagged, any tag transferred to a new document would be recognized as invalid upon performing the trace function for the document.

In an advantageous embodiment of the invention, the processor identifiers used to compute the identification tags are stored directly in a computer processor. Although memory within a processor itself is expensive, such an embodiment provides the advantage that the processor identifier is not alterable by a user of the processor. Similarly, it is advantageous to include at least a portion of the program code that computes the identification tag in the processor memory. Again, this provides the benefit that the code cannot be altered by a user of the processor.

These and other advantages of the invention will be apparent to those of ordinary skill in the art by reference to the following detailed description and the accompanying drawings.

DETAILED DESCRIPTION

Figure 1:
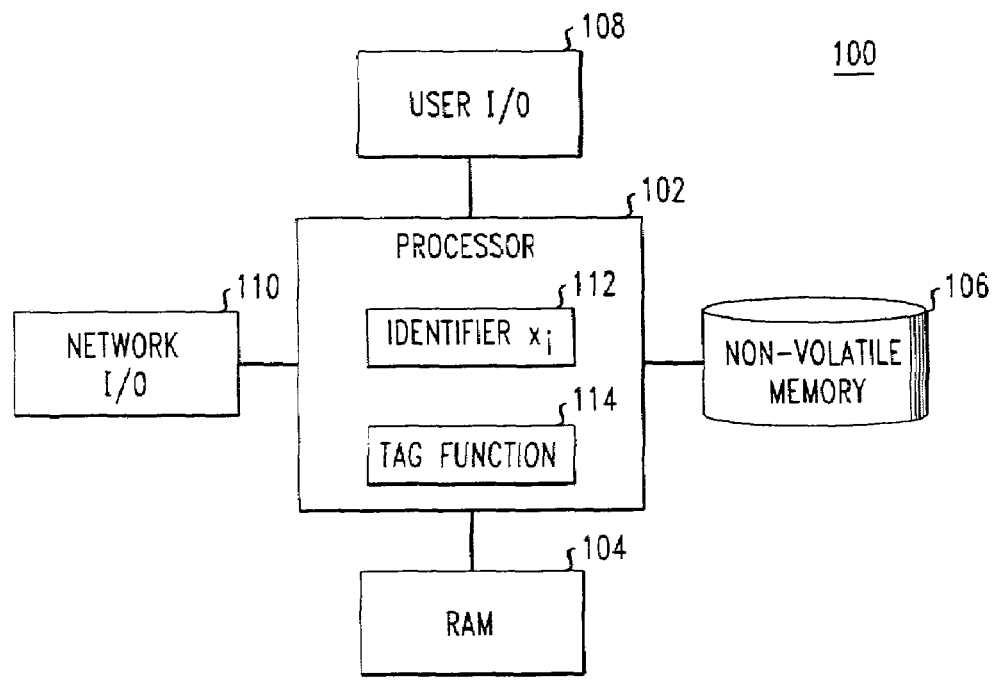
FIG. 1 shows a computer system of the type that may be used to implement the present invention.

FIG. 1 shows a computer system 100 of the type that may be used to implement the present invention. Computer systems are well known in the art, and FIG. 1 shows only high level functional components in order to describe the principles of the present invention. Computer system 100 comprises a processor 102 that controls the operation of the computer system 100 by executing computer program code. Such computer program code, as well as other data, may be stored in random access memory 104 and non-volatile memory (e.g., magnetic or optical disk drive) 106 connected to the processor 102. Computer program code and data may also be stored directly on processor 102 itself. Since memory space on the processor 102 is limited, computer program code stored directly on processor 102 itself is generally limited to program code which is essential for the proper operation of the processor. Such program code is often referred to as microcode, and cannot be modified by users. Computer system 100 also contains user input/output devices 108 used to interact with a user of the system. User input/output devices may be, for example, a mouse, keyboard, monitor, printer, etc. Computer system 100 also contains network input/output devices 110 used for communication with data networks such as local area networks, wide area networks, or the Internet. Such network input/output devices 110 are well known in the art and may implement various communication protocols to allow the computer system 100 to communicate with data networks.

Referring now more particularly to processor 102, FIG. 1 shows the processor 102 containing a processor identifier $X_i$ 112 and tag function code 114 stored directly in the microprocessor 102. As will be described in further detail below, the processor identifier $X_i$ 112 is a unique identifier for this particular processor 102 that is placed in the memory of processor 102 by the manufacture. Each processor created by the manufacturer would have a unique processor identifier stored in the processor. If multiple manufacturers are contemplated, then the manufacturers can coordinate to ensure that each processor, regardless of manufacturer, contains a unique processor identifier. The identifier $X_i$ 112 cannot be altered by a user of processor 102. Similarly, the tag function code 114 is stored in the memory of processor 102 as microcode by the manufacture. As such, the tag function code 114 cannot be altered by a user of processor 102. Although not required to implement the present invention, storing the identifier $X_i$ 112 and the tag function code 114 directly on the processor 102 itself is advantageous because it prevents alteration of the data and program code and as such enhances the security features of the invention.

Figure 2:
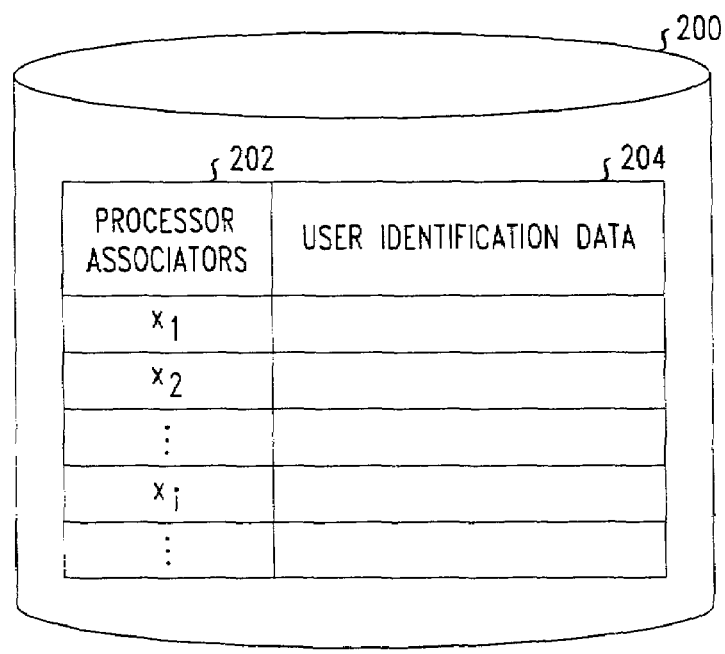
FIG. 2 shows an exemplary database in accordance with a first embodiment of the invention.

In accordance with the principles of the invention, documents which are created by the computer system 100 are tagged with an identification tag as will be described in further detail below. As used herein, the term document is meant to encompass any type of computer readable data, and includes, without limitation, text documents, emails, programs, multimedia files, audio files, graphics files, video files, web pages, etc. In order for a third party to later trace the source of a tagged document, the third party must have access to a database containing a plurality of so-called processor associators along with user identification data associated with each of the processor associators. An exemplary database in accordance with a first embodiment of the invention is shown in FIG. 2. The database 200 stores a plurality of processor associators 202, each associated with user identification data 204. The processor associators 202 in the first embodiment are the same as the processor identifiers $X_i$ 112 stored in the processors. Thus, each processor manufactured by a processor manufacturer would have a unique processor identifier and that processor identifier would also be included as a processor associator in an entry of a database. However, as described below in connection with a second embodiment of the invention, it will be seen that the processor associators 202 do not need to be the same as the processor identifiers stored in the processors 102. Each processor associator 202 is associated with user identification data 204 which contains information which would identify the user of the associated processor. Such data may be collected, for example, at the time of purchase of the computer system 100 by the user, by a user registration process, or any other means. The user identification data 204 may, instead of identifying a particular user, identify a company or any other entity or class of entities. Ultimately, the extent of traceability of documents created by a particular processor will be determined by the type of information stored as user identification data in the database.

Figure 3:
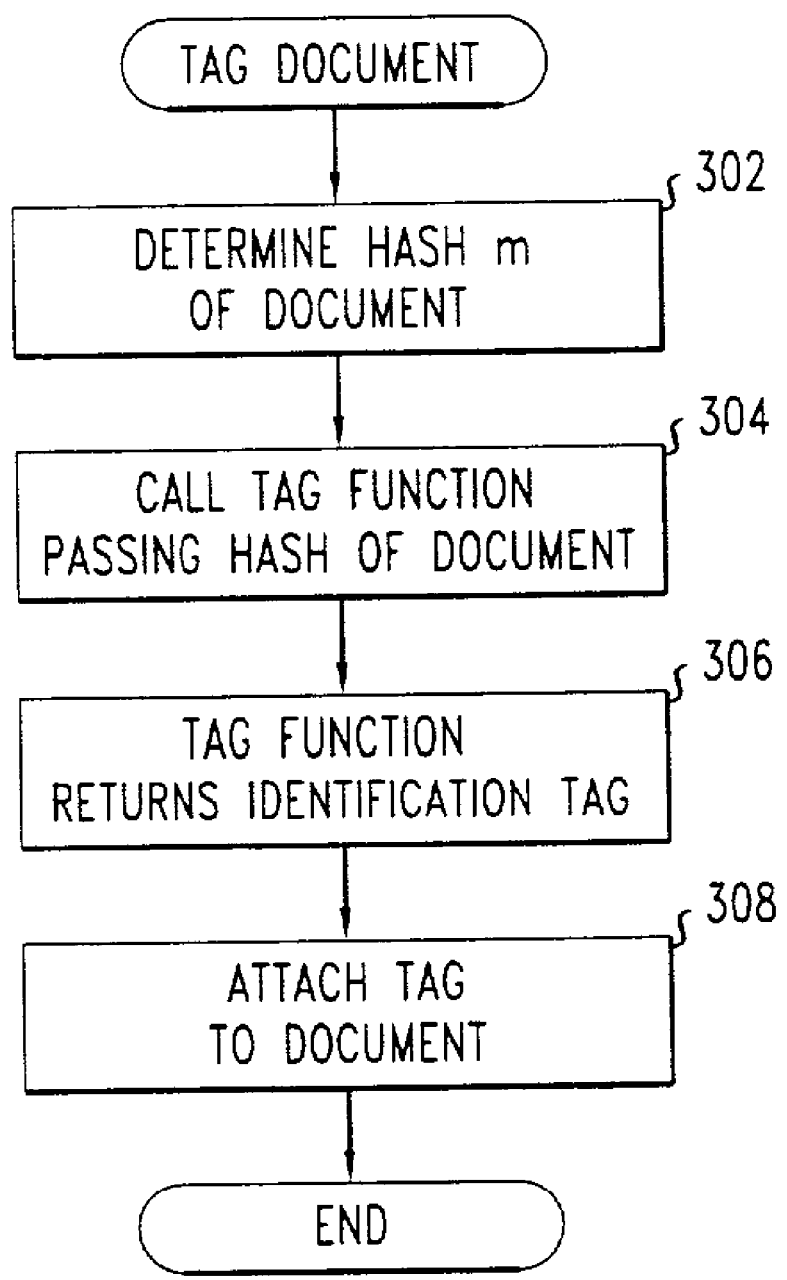
FIG. 3 is a flowchart showing the steps performed in order to tag a document with an identification tag.

The steps performed by computer 100 in order to tag a document are shown in FIG. 3. These steps are performed by processor 102 executing computer program code stored in either the random access memory 104, the non-volatile memory 106, or any other memory to which the processor 102 has access. It is possible to store this program code directly on processor 102 as microcode, but given current microprocessor limitations and cost concerns, such placement of the tagging software in its entirety would not be advantageous. Referring now to the steps of FIG. 3, in step 302 the document to be tagged is hashed to determine a hash value m. A hash function is a well known function in computer science in which a digest of an input is produced as output. For cryptographically secure hash functions, this digest is such that given any particular fixed hash function, it is not possible to find two inputs that produce the same digest. Moreover, a cryptographically secure hash function has the property that it is difficult to determine the input to the function given only the output (i.e., the digest). MD5 is a well known exemplary hash function. A description of MD5 is provided at *The MD5 Message-Digest Algorithm*, R. Rivest, Network Working Group, Request for Comments (RFC): 1321, MIT Laboratory for Computer Science and RSA Data Security, Inc., April 1992. As used herein, reference to a hash function means a cryptographically secure hash function. In step 304 the tag function is called passing it the hash value as a parameter. As described above, in an advantageous embodiment, the tag function is a processor 102 function whose operation is defined as microcode 114 stored in the processor 102.

The tag function performs a cryptographic function on the hash value m and the unique processor identifier $X_i$ 112 stored in the processor 102. In the first embodiment, in which the processor associators 202 are the same as the identifiers stored in the processors, the tag function is defined as follows:

$$TAG(m) = MAC_{Xi}(m)$$

where MAC represents a Message Authentication Code function. The Method Authentication Code function is a well known cryptographic construction in which the input consists of a message and a key, and the output is such that it could not have been produced without knowledge of the key. Moreover, given the output, it is not possible to determine the input to the function. A well known exemplary MAC function is SHA-1, which is described in further detail at, Federal Information Processing Standards Publication 180-1, FIPS PUB 180-1, Secure Hash Standard, Computer Systems Laboratory, National Institute of Standards and Technology, Gaithersburg, Md. 20899, Apr. 17, 1995.

In step 306, the tag function returns the identification tag which is the value computed in step 304. In step 308 the identification tag is attached to the document. The tag may be attached to the document in any number of ways that allow the tag to be associated with the document. Thus, the term attach is used to convey the notion that the tag is somehow associated with the document such that the document and tag may be stored and transmitted in a manner that conveniently allows the tag to continue to be associated with the document. For example, and without limitation, the tag may be attached to the document by embedding the tag within the document, including the tag in a header of the document, or appending the tag to the end of the document. One skilled in the art of compute files and data structures will readily recognize that there are many techniques available for associating the tag with the document, and as used herein, the term attach encompasses all such techniques.

Once a document is appropriately tagged with an identification tag as described above, the source of the document may be traced by an authorized third party as follows. As described above, an authorized third party has access to database 200 that contains processor associators 202 and associated user identification data 204. Upon receipt of a document to be traced, the authorized third party performs the steps shown in FIG. 4.

In step 402 the authorized third party extracts the tag from the document to be traced. The method of extraction will depend on the method used to attach the tag to the document. In step 404, the document to be traced is hashed to determine a hash value m. The particular hash function used in step 404 is the same hash function that was used in step 302. At this point, the authorized third party is in possession of the document's identification tag, the document hash value m, and a list of processor associators $X_i$ in database 200. The remaining steps shown in FIG. 4 describe the steps in which the authorized third party will apply the tag function using the hash value m determined in step 404 for each of the possible processor associators $X_i$ until the result of the tag function matches the tag extracted in step 402. When such a match is found, it is known that the user identified by the user identification data associated with the particular processor associator used to create the match is the source of the document. The particular steps are described in further detail in conjunction with steps 406 through 420.

In step 406 a counter i is initialized to 1. In step 408, the processor associator $X_i$ is retrieved from database 202. In step 410 the authorized third party computes TAG (m) using the processor identifier $X_i$ that is retrieved from database 202 in step 408. The TAG function used in step 410 is the same TAG function described above in conjunction with step 304 which created the tag for this document. In step 412 it is determined whether the tag value computed in step 410 matches the tag identification extracted from the document in question in step 402. If there is a match, then in step 414 the source of the document in question is identified by the user identification data associated with the processor associator $X_i$ in database 200 and the method ends in step 420.

If it is determined in step 412 that the tag value computed in step 410 does not match the tag identification extracted from the document in question in step 402, then in step 416 the counter i is incremented by one. In step 418 it is determined whether i>n, where n is the total number of processor associators stored in database 200. If i>n, then no match was found and the method ends in step 420. If i<=n, then control returns to step 408 and steps 408 through 418 are repeated in an attempt to find a match.

In a second embodiment of the invention, the processor associators stored in the database are not the same as the processor identifiers stored in the processors. Instead, each processor identifier is a function of a processor associator. This second embodiment, which is based on cryptographic structures related to public key cryptography, provides the benefit of allowing the tracing party to be distributed. Thus, the tracing party may consist of some n parties or servers, out of which k parties or servers must collaborate in order to perform a trace. In this embodiment, n and k may be arbitrary positive integers such that k is less than or equal to n. Note that if n and k are not equal, then it is possible for some parties or servers to be unavailable while still allowing a trace to be performed. The benefits of this second embodiment come at the cost of additional computational complexity over the first embodiment that is based on cryptographic structures related to symmetric key cryptography.

Referring again to FIG. 2, if a processor associator is defined as $X_i$, then the corresponding processor identifier $Y_i$ that would be stored in the processor in accordance with the second embodiment is defined as $Y_i = g^{X_i}$ mod p, where g is a generator of $G_p$ and p is a publicly known large prime number. Further, in accordance with this second embodiment, the tag function used to calculate the identification tag described above in conjunction with step 304 is modified. As described above, the tag function performs a cryptographic function on the hash value m and the unique processor identifier (referred to as $Y_i$ in the second embodiment) stored in the processor. In this second embodiment, in which the processor identifier $Y_i$ is a function of a processor associator $X_i$, the tag function is defined as follows:

TAG(m)=(G,Y,S) where $G = g^a$ mod p, $Y = Y_i^a$ mod p, and

S is a proof of knowledge of a, given (g,G), where a is a random or pseudorandom number chosen for the particular function invocation.

Typical proofs of knowledge of a discrete logarithm are well known in the art, for example Schnorr signatures are described at C. Schnorr, Efficient Signature Generation By Smart Cards, *J. Cryptology*, 4, pp. 161-174 (1991), and DSA (also referred to as DSS) signatures are described at Federal Information Processing Standards Publication 186-2, FIPS PUB 186-2, Digital Signature Standard (DSS), U.S. Department of Commerce, National Institute of Standards and Technology, Jan. 27, 2000. The proof is made relative to the input m, and to (G,Y), all of which are hashed together to produce the challenge for the signature protocol employed. Proofs of knowledge as described above are well known in the art.

Other than the differences described above, the generation of a tag, and the attachment of that tag into the document, are the same as described above in conjunction with FIG. 3.

Figure 4:
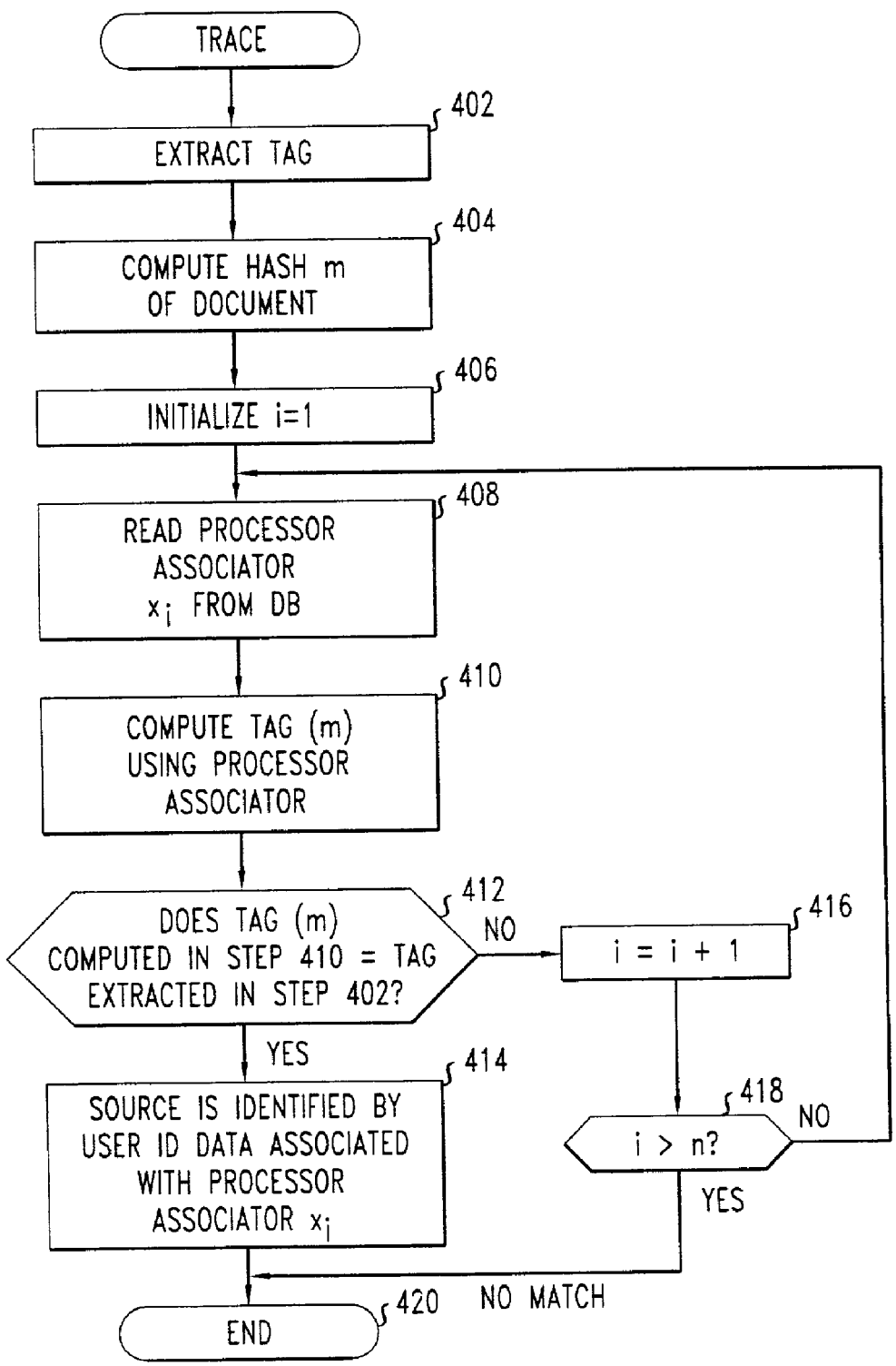
FIG. 4 is a flowchart showing the steps performed in order to trace the source of a document.

Now turning to the trace method in accordance with this second embodiment, the trace steps are similar to the trace steps described above in connection with the first embodiment and FIG. 4, with the following modifications. In step

410, the authorized third party computes $g^{X_i}$. In step 412, the authorized third party compares $g^X$ computed in step 410 with the Y value which was extracted as part of the tag in step 402 (recall that TAG(m)=(G,Y,S)). If there is a match, then control passes to step 414. If there is not a match, then control passes to step 416. The remaining steps of FIG. 4 remain as described above.

As would be recognized by one skilled in the art given the above description, the benefits of the invention depend on the secrecy of the processor associators stored in the database maintained by an authorized third party (e.g., the processor manufacturer). The second embodiment has the advantage that the database may be kept in a distributed fashion such that $X_i$ is distributively held by several parties or servers, and accessed using a threshold scheme. One well known method for holding $X_i$ distributively is Shamir secret sharing, as described in Shamir A., How to Share a Secret, Communications of the ACM, Vol. 22, No. 11, pp. 612-613, November 1979.

The above description of the present invention describes a method for tracing the source of a document. However, the present invention provides additional advantageous capabilities. For example, consider a first authorized third party that maintains the processor associator database 200 (e.g., the processor manufacturer) and a second authorized third party that investigates network attacks (e.g., law enforcement). By using the principles of the present invention, useful capabilities are enabled. For example, law enforcement can be enabled to correlate documents that are produced by the same source, without being able to determine the identity of the source. This capability would proceed as follows. Law enforcement would provide the processor manufacturer a first document. The processor manufacturer, using the techniques described above, would determine the source of the document, but would only provide back to law enforcement the processor associator (i.e., $X_i$ in the first embodiment or $Y_i$ in the second embodiment), not the user identification data associated with the processor associator. Law enforcement could then screen other documents and determine if the other documents were created by the same source, but without being able to determine the identity of the source and without being able to correlate documents of other sources.

Another advantageous property of the present invention is that framing is impossible. That is, it is not possible for a malicious user to manipulate the tag of one of his/her documents to make it appear that the document was created by another source. Even if the malicious user intercepts or otherwise gains knowledge of a tag generated by another user, the tag will cease to be valid when not associated with the particular document for which it was originally produced because, as described above, tags are a function of both the processor identifier as well as the particular document. Once the document changes, its hash changes, and thus a transfer of a tag from one document to another is easily detectable and invalid.

The embodiments described above describe the use of a single tag per document. However, it is also possible to attach multiple tags per document. As would be understood from the description of tag generation, the tag of a document would change as the result of either 1) a modification of the document or 2) a change in the creator of the document. Thus, multiple tags attached to a document could be used to track revisions by a particular user and/or revisions by multiple users. It is possible that an implementation incorporating this multiple tag feature could result in a large number of tags being attached to each document. For example, a single user may revise and save a particular document many times, and a tag for each such revision may not be required. One alternative is to only attach one tag per user, or only one tag per user per editing session. Another technique to manage the number of tags attached to a single document is to limit the number of tags to some maximum number. When the number of tags associated with a particular document reaches this maximum number, the oldest tag may be replaced with the newest tag. One skilled in the art would be able to modify the embodiments described above in order to implement this multiple tag embodiment.

The first embodiment described above discloses the use of the MAC cryptographic function to create the tag. The second embodiment described above discloses the use of the modular exponentiation cryptographic function to create the tag. One skilled in the art of computer science and cryptography would readily recognize that other cryptographic functions could be used in order to implement the present invention. For example, such a function may be based on any type of modular exponentiation modulo prime fields, and may be implemented, for example, using elliptic curves.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for operation of a computer system for identification tagging a document created by said computer system comprising the steps of:

calculating a function of the document;

creating an identification tag by performing a cryptographic function on said function of the document and a unique processor identifier associated with said computer system, said cryptographic function producing an identification tag having the characteristics that a third party, said third party being unassociated with, and independent from, the creation of said created document by said computer system, possessing said document, said identification tag, and a plurality of unique processor associators each having a relationship to an associated one of a plurality of processor identifiers, can determine a source of said document as a function of identifying said computer system; and attaching said identification tag to said document.

2. The method of claim 1 wherein said function of the document is a hash function.

3. The method of claim 1 wherein said relationship between a unique processor identifier and its associated unique processor associator is one of equality.

4. The method of claim 3 wherein said cryptographic function is a Message Authentication Code.

5. The method of claim 1 wherein said relationship between a unique processor identifier and its associated unique processor associator is that said unique processor identifier is a function of its associated processor associator.

6. The method of claim 5 wherein said cryptographic function is based on modular exponentiation.

7. The method of claim 1 wherein said unique processor identifier is stored in a processor of said computer system.

8. A processor comprising:

a stored unique processor identifier; and stored tag function program code which when executed by the processor calculates an identification tag by performing a cryptographic function on a function of a document and said unique processor identifier, wherein said cryptographic function produces an identification tag having the characteristics that a third party, said third party being unassociated with, and independent from, the creation of said document, possessing said identification tag, said document, and a plurality of unique processor associators each having a relationship to an associated one of a plurality of processor identifiers, can identify a source of said creation of said document as a function of identifying said processor.

9. The processor of claim 8 wherein said function of a document is a hash function.

10. The processor of claim 8 wherein said relationship between a unique processor identifier and its associated unique processor associator is one of equality.

11. The processor of claim 10 wherein said cryptographic function is a Message Authentication Code.

12. The processor of claim 8 wherein said relationship between a unique processor identifier and its associated unique processor associator is that said unique processor identifier is a function of its associated processor associator.

13. The processor of claim 12 wherein said cryptographic function is based on modular exponentiation.

14. A computer system for identification tagging a document created by said computer system comprising:

means for calculating a function of the document;

means for creating an identification tag by performing a cryptographic function on said function of the document and a unique processor identifier associated with said computer system, said cryptographic function producing an identification tag having the characteristics that a third party, said third party being unassociated with, and independent from, the creation of said created document by said computer system, possessing said document, said identification tag, and a plurality of unique processor associators each having a relationship to an associated one of a plurality of processor identifiers, can determine a source of said document as a function of identifying said computer system; and means for attaching said identification tag to said document.

15. The computer system of claim 14 wherein said function of the document is a hash function.

16. The computer system of claim 14 wherein said relationship between a unique processor identifier and its associated unique processor associator is one of equality.

17. The computer system of claim 16 wherein said cryptographic function is Message Authentication Code.

18. The computer system of claim 14 wherein said relationship between a unique processor identifier and its associated unique processor associator is that said unique processor identifier is a function of its associated processor associator.

19. The computer system of claim 18 wherein said cryptographic function is based on modular exponentiation.

20. The computer system of claim 14 wherein said unique processor identifier is stored in a processor of said computer system.

* * * * *